F. R. JONES.
GEAR CUTTING MACHINE.
APPLICATION FILED NOV. 29, 1920.

1,438,530. Patented Dec. 12, 1922.

INVENTOR.
Forrest R. Jones

Patented Dec. 12, 1922.

1,438,530

UNITED STATES PATENT OFFICE.

FORREST R. JONES, OF KNOXVILLE, TENNESSEE.

GEAR-CUTTING MACHINE.

Application filed November 29, 1920. Serial No. 426,924.

*To all whom it may concern:*

Be it known that I, FORREST R. JONES, a citizen of the United States, residing at Knoxville, in the county of Knox and State of Tennessee, have invented new and useful Improvements in Gear-Cutting Machines, of which the following is a specification.

My invention relates to the cutting of gears with a rack-type cutter which reciprocates across the face of the gear-blank which is to be cut.

The object of the invention is to provide a machine which will completely cut a gear without indexing the gear-blank, and which will perform the entire cutting operation automatically, first roughing out all of the spaces of the blank, and then finishing all of the spaces.

Figure 1:
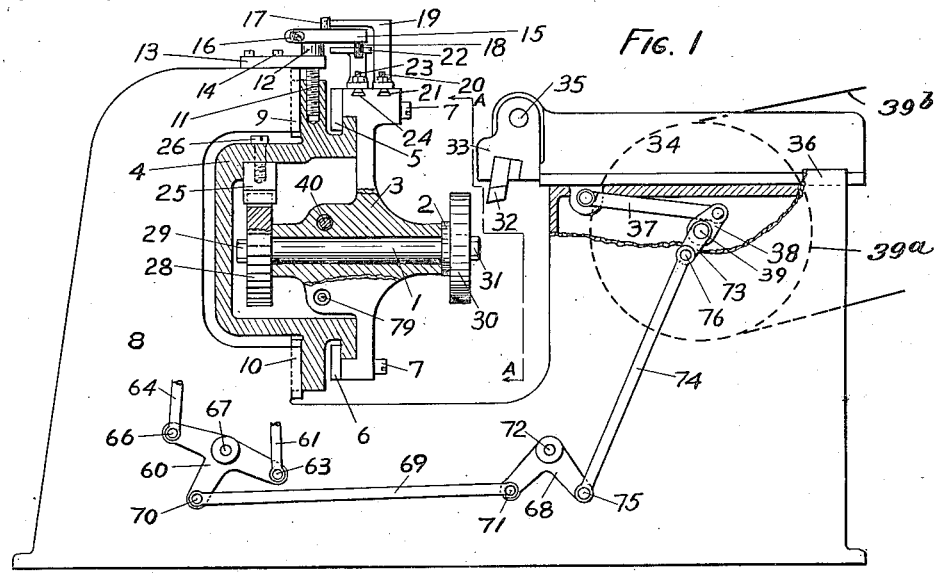
Fig. 1 is chiefly a side elevation of the machine, but partly sectional.

A spindle 1 integral with its collar 2 is rotatably carried by a saddle 3 slidably mounted on a crossrail 4 and held in place by means of the saddle clamps 5 and 6 fastened to the saddle by means of cap screws 7. The crossrail 4 is slidably mounted on the frame 8 by means of vertical slides 9 and 10.

At the top of the crossrail is a depth-screw 11 whose collar 12 rests on a supporting plate 13 which carries the weight of the crossrail and is fastened to the frame by means of cap screws 14. On the upper end of the depth-screw a bell-crank 15 is rigidly clamped by means of the clamp-screw 16. A pin 17 extends upward from near the end of one arm of the bell-crank, and from near the end of the other arm a pin 18 extends downward.

A plate-cam 19 is fastened rigidly on the top of the crossrail by means of bolts 20 whose dove-tail heads fit into a corresponding groove 21 in the crossrail. Another plate cam 22 is similarly fastened to the top of the crossrail by means of bolts 23 and the groove 24. The cam 19 is adapted to engage the pin 17, and the cam 22 is adapted to engage the pin 18.

A rack 25 is rigidly fastened to the crossrail by means of cap screws 26 and 27, so that the length of the rack is parallel to the direction in which the saddle slides on the rail.

The rack 25 engages with a gear 28 rigidly held on the spindle 1 by means of the spindle nut 29. A gear-blank 30 is rigidly mounted on the opposite end of the spindle and held in place by means of the spindle nut 31.

A rack-type cutter 32 is clamped in a cutter holder 33 which is hinged on the end of the ram 34 by means of the hinge-pin 35. The ram is slidably mounted on the frame by means of the sliding bearing 36 and reciprocated in the ordinary manner by means of the connecting rod 37 and crank 38 mounted on the driving shaft 39, on which is rigidly mounted the pulley $39^a$ driven by the belt $39^b$.

A feed screw 40 passes through a threaded hole, which serves as a nut, in the saddle, is supported by the ends of the crossrail, and has a shaft-like extension (see Fig. 2) toward the left from the crossrail. The extreme left-hand end (in Fig. 2) of the feed-screw is supported by the housing 41 fastened to the crossrail by means of cap-screws 42. End motion of the screw is prevented by the collar 43 and ring-nut 44. On the shaft-like extension of the feed-screw two collars 45 and 46 are rigidly mounted.

Also on the shaft-like part of the feed-screw is rotatably mounted a left-handed ratchet-wheel 47 integral with a jaw-clutch member 48. A right-handed ratchet-wheel 49 integral with a jaw-clutch member 50 is also rotatably mounted on the shaft-like part of the feed-screw. Between these clutch members is a sliding clutch member 51 keyed to the feed-screw shaft against rotation by means of the feather-key 52, and adapted to engage either of the clutch members 48 and 50. A part 53 of the sliding clutch-member is of enlarged diameter, and on the periphery of this enlarged part rests the lower end of the pin 54 which passes freely through a hole in housing and has a knob 55 at its upper end.

A rocker-arm 56 is rotatably mounted on the shaft-like extension of the feed-screw and carries a pawl 57 which engages the teeth of the left-hand ratchet wheel 47, and another rocker-arm 58 is similarly mounted and carries a pawl 59 which engages the teeth of the right-hand ratchet-wheel 49.

The pawl 57 has an enlarged free end 57a to hold the pawl against the ratchet-wheel 47 by action of gravity. The outer end of the rocker-arm 56 is connected to one arm of a three-arm rocking member 60 by means of the rod 61 and the hinge-pins 62 and 63; and the rocker-arm 58 is similarly connected to another arm of the three-arm rocking member by means of the rod 64 and hinge-pins 65 and 66. The three-arm member 60 is mounted on a pin 67 which is rigid with the frame of the machine, and its lower arm is connected to a bell-crank 68 by means of a rod 69 and the hinge-pins 70 and 71. The bell-crank 68 is adapted to rock on the frame pin 72 and has its other arm connected to the crank-arm 73 by means of a rod 74 hinge-pin 75 and crank-pin 76. The crank-arm 73 is rigid with the driving shaft 39.

A shifter-arm 77 fits freely in a circumferential groove 78 of the clutch member 51 and is rigidly fastened on the shifter-rod 79 by means of the set-screw 80. The shifter-rod is supported by and pases freely through the bearing 81 and the ends of the crossrail; it also passes loosely through a hole in the saddle. On the shifter-rod is a collar 82 adjustable along the shifter-rod and fastened in place by a set-screw 83; a similar collar 84 is fastened in place on the shifter-rod by means of the set-screw 85.

Between the collar 82 and the saddle is a coiled compression spring 86 on the shifter-rod; and a similar compression spring 87 is on the shifter-rod in a position intermediate between the collar 84 and the saddle.

A lock-pin 88 passes slidably through the wall of the housing and has a V-shaped end which fits into a corresponding V-shaped notch 89 in the shifter-rod. A spring 90 presses the lock-pin into the notch, and is fastened to the housing by means of cap-screws 91.

There is also another V-shaped notch 92 similar to the notch 89. The distance between the notches 89 and 92 is equal to the distance through which the sliding member of the jaw clutch must be moved to change it from the position of full engagement with the clutch member 48 to the position of full engagement with the clutch member 50.

The operation of the machine is as follows:

Rotation of the driving shaft 39 in a counter-clockwise direction, Fig. 1, from the position of the crank 38 as shown in Fig. 1, causes the cutter 32 to move forward at first on its cutting stroke across the periphery of the gear-blank, then backward on the return stroke, and so on in the ordinary manner. During this movement of the cutter, the crank 73, operating through the mechanical train embodying the rod 74, bell-crank 68, rod 69, three-arm rocker member 60 and the rods 61 and 64, imparts a rocking motion to the ratchet-arms 56 and 58, whose pawls 57 and 59 thereby cause the ratchet wheels 47 and 49 to rotate intermittently, each in the direction indicated by the arrow on it.

Figures 2, 3:
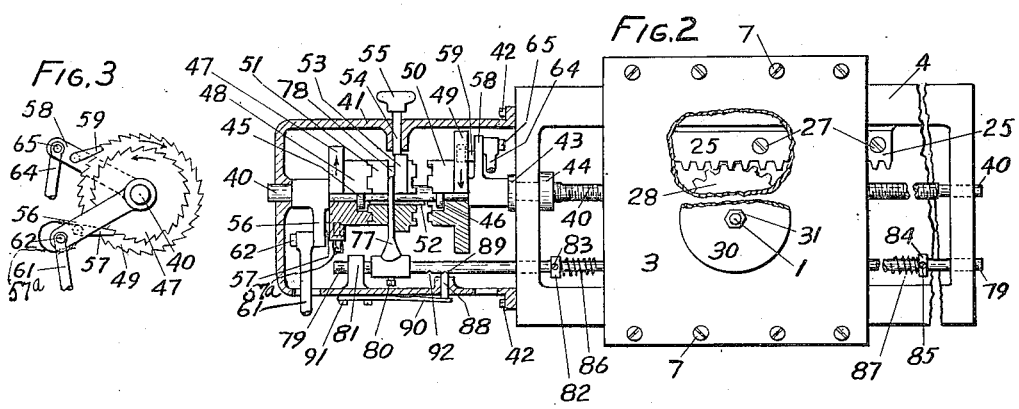
Fig. 2 is a front elevation, partly broken away, of some of the members to the left of the line A—A in Fig. 1.
Fig. 3 is a detail of the feed mechanism.

As shown in Fig. 2, the jaw-clutch extension 48 of the left-hand ratchet wheel 47, is in engagement with the sliding clutch-member 51. The intermittent rotation of the left-hand ratchet-wheel is therefore transmitted to the feed-screw 40, and consequently an intermittent sliding motion of the saddle 3 is effected in a direction toward the right in Fig. 2.

As the saddle moves toward the right in Fig. 2, it contacts with and compresses the coil-spring 87 on the shifter rod 79, until the coils of the spring are set solid, coil against coil, the right-hand end of the spring pressing against the collar 84. Then the additional movement of the saddle toward the right forces the shifter-rod along with it at the same rate until the lock-pin 88 is forced out of the notch 89 in the shifter-rod. The coil-spring 87 then expands quickly, thus moving the shifter-rod, the shifter-arm 77 and the sliding clutch-member 51 toward the right, thereby moving the latter with corresponding rapidity from engagement with the clutch member 48 to engagement with the clutch member 50 on the right-hand ratchet-wheel 49. The corresponding position of the shifter-rod is such that the lock-pin 88 engages the notch 92 in the shifter-rod. The right-hand ratchet-wheel 49 now drives the feed-screw in the opposite direction so that the saddle is given an intermittent motion toward the left.

The saddle 3, thus traveling toward the left in Fig. 2, compresses the coil-spring 86 until its coils are solid against each other, then forces the shifter-rod toward the left, and the lock-pin 88 out of the notch 92.

The expansive force of the coil-spring 86 then rapidly moves the shifter-rod, the shifter-arm, and the sliding clutch-member toward the left, so that the latter is moved out of engagement with the clutch-member 50, but the sliding clutch-member is prevented from engaging with the clutch-member 51 by means of the pin 54, for when the sliding clutch-member was moved toward the right into engagement with the right-hand clutch-member 50, the enlarged diameter 53 of the sliding clutch-member moved out from under the end of the pin 54 thus permitting the latter to drop to the position in which the knob 55 rests on the housing 41, the end of the pin thus being brought to a position to limit the left-hand movement of the sliding clutch-member. The relative positions of the pin 54 and the left-hand side of the enlarged part 53 of the sliding clutch-member, are such that when the left-hand side of this enlargement is pressed against the pin, the sliding clutch-member is free from engagement with the clutch-members 48 and 50.

Accordingly, when the sliding clutch-member is moved toward the left from engagement with the right-hand clutch-member as described above, and is stopped in a neutral position by the pin 54, there is then no rotative movement transmitted to the feed-screw. The saddle then remains at rest, and the coil-spring 86 is held partly compressed. The starting of the feed motion again is done by raising the pin out of engagement with the side of the enlarged part 53 of the sliding clutch-member, thus permitting the coil-spring 86 to expand and move the sliding clutch-member into engagement with the left-hand clutch-member 48.

As the saddle travels along the cross-rail, as described above, the gear 28 rolls along the rack 25, and the gear-blank rolls in correct relation to the cutting tool.

One method of cutting a gear is to first take a roughing cut in all of the tooth spaces, and then a finishing cut to a greater depth in all of the tooth spaces, by entirely automatic operation. In order to accomplish this, automatic means are provided to raise the gear-blank toward the cutter after the roughing cut is completed, and before the finishing cut is started. Automatic means are also provided for moving the finished gear-blank (now a gear) down to its initial level, so that the machine is again in position to make the roughing cut on another gear-blank of the same size as the one just finished, the depth of the roughing cut to be the same as before.

Figure 4:
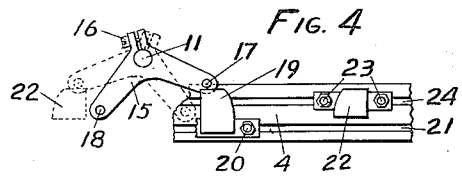
Fig. 4 is a plan view of the mechanism at the top of the machine.

The roughing cut is started when the saddle is near the left-hand end of the crossrail in Fig. 2, and near the observer in Fig. 1. The bell-crank 15 is then in its dotted line position as shown in Fig. 4. As soon as the roughing cut is completed, the plate-cam 19 contacts with the upper depth-pin 17 while the latter is in its dotted-line position, Fig. 4, as the saddle continues its travel toward the right in Fig. 2, along the crossrail, and, as the saddle still continues traveling toward the right, the plate-cam 19 pushes the pin 17 and the bell-crank 15 around to the full line position of Fig. 4, which corresponds to the position in Fig. 1. The depth-screw 11 is thus rotated so as to raise the crossrail and thereby the roughed-out gear-blank to the level corresponding to the required depth of tooth-space. Reversal of the direction of travel of the saddle is then effected, as hereindescribed, and the finishing cut begins. By the time the finishing cut is completed, the plate-cam 22 is carried, by the left-hand movement of the saddle, toward the left so that the plate-cam 22 contacts with the pin 18 when the latter is in its full-line position of Fig. 4, and then pushes the pin 18 and rocker-arm 15, around to the dotted-line position of Fig. 4, thus rotating the depth-screw 11 in a direction to lower the crossrail, and the newly-cut gear to their original levels.

What I claim is:

1. In a gear-cutting machine, the combination of a rack-type cutter, means to reciprocate the cutter, a gear rigidly mounted on a spindle adapted to rigidly hold a gear-blank to be cut, a rack in mesh with the gear, a crossrail rigidly supporting the rack, a saddle slidably mounted on the crossrail and rotatably supporting the spindle, automatic means to feed the saddle along the rail, and automatic means to reverse the direction of the motion of the saddle.

2. In a gear-cutting machine the combination of a rack-type cutter, means to reciprocate the cutter, a gear rigidly mounted on a spindle adapted to hold a gear-blank to be cut, a rack in mesh with the gear, a crossrail rigidly supporting the rack, a saddle slidably supported on the crossrail and rotatably supporting the spindle, automatic means to feed the saddle along the crossrail, automatic means to reverse the direction of motion of the saddle, and means to automatically stop the motion of the saddle.

3. In a gear-cutting machine, the combination of a rack-type cutter, means to reciprocate the cutter, a gear and a gear-blank rigidly mounted on a spindle, a rack in mesh with the gear, a crossrail rigidly supporting the rack, a saddle slidably mounted on the crossrail and rotatably supporting the spindle, automatic means to feed the saddle along the crossrail, automatic means to reverse the direction of motion of the saddle, means to automatically stop the motion of the saddle, and means to automatically change the depth to which the cutter cuts into the gear-blank.

4. In a gear-cutting machine, the combination of a rack-type cutter, means to reciprocate the cutter, a gear and a gear-blank rigidly mounted on a spindle, a rack in mesh with the gear, a crossrail rigidly supporting the rack, a saddle slidably mounted on the crossrail and rotatably supporting the spindle, automatic means to feed the saddle along the crossrail, automatic means to reverse the direction of motion of the saddle, means to automatically stop the motion of the saddle, means to automatically change the depth to which the cutter cuts into the gear-blank, and means to automatically adjust the spindle for the depth of the first cut in a succeeding gear-blank.

5. In a gear-cutting machine, the combination of a rack-type cutter, means to reciprocate the cutter, a gear and a gear-blank rigidly mounted on a spindle, a rack in mesh with the gear, a crossrail rigidly supporting the rack, a saddle slidably mounted on the crossrail and rotatably supporting the spindle, automatic means to feed the saddle along the crossrail, automatic means to reverse the direction of motion of the saddle, and means to automatically change the depth to which the cutter cuts into the gear-blank.

6. In a gear-cutting machine, the combination of a rack-type cutter, means to reciprocate the cutter, a gear and a gear-blank rigidly mounted on a spindle, a rack in mesh with the gear, a crossrail rigidly supporting the rack, a saddle slidably mounted on the crossrail and rotatably supporting the spindle, automatic means to feed the saddle along the crossrail, automatic means to reverse the direction of motion of the saddle, means to automatically change the depth to which the cutter cuts into the gear-blank, and means to automatically adjust the spindle for the depth of the first cut in a succeeding gear-blank.

7. In a gear cutting machine, in combination, a reciprocable rack-type cutter, means to feed a gear-blank along the cutter first in one direction and then in the opposite direction, and automatic means to reverse the direction of feeding.

8. In a gear cutting machine, in combination, a reciprocable rack-type cutter, means to feed a gear-blank along the cutter first in one direction and then in the opposite direction, and automatic means to change the depth of the cut.

9. In a gear cutting machine, in combination, a reciprocable rack-type cutter, means to feed a gear-blank along the cutter first in one direction and then in the opposite direction, means to adjust for a deeper cut, and automatic means to adjust again to the depth of the first cut.

10. In a gear cutting machine, in combination, a reciprocable rack-type cutter, means to feed a gear-blank along the cutter first in one direction and then in the opposite direction, and automatic means to permanently stop the gear-blank in a predetermined position.

11. In a gear cutting machine, in combination, a reciprocable rack-type cutter, means to feed a gear-blank along the cutter, means to reverse the direction of the feeding, and automatic means to permanently stop the moving of the gear-blank.

12. In a gear cutting machine, in combination, a reciprocable rack-type cutter, means to feed a gear-blank along the cutter first in one direction and then in the opposite direction, means to change the depth of cut, and automatic means to permanently stop the moving of the gear-blank.

13. In a gear cutting machine, in combination, a reciprocable rack-type cutter, means to feed a gear-plank along the cutter first in one direction and then in the opposite direction, means to adjust for a deeper cut, means to readjust to the depth of the first cut, and automatic means to permanently stop the moving of the gear-blank.

14. In a gear cutting machine, in combination, a reciprocable rack-type cutter, means to feed a gear-blank along the cutter first in one direction and then in the opposite direction, means to adjust for a deeper cut, means for readjusting to the depth of the first cut, and automatic means to permanently stop the gear-blank at a predetermined position.

15. In a gear cutting machine comprising a rack-type cutter reciprocable in a fixed path, automatic means to guide and propel a gear-blank consecutively through three phases of motion as follows: First phase, feeding the gear-blank forward along the cutter; second phase, moving the gear-blank toward the cutter; third phase, feeding the gear-blank backward along the cutter.

16. In a gear cutting machine comprising a rack-type cutter reciprocable in a fixed path, automatic means to guide and propel a gear-blank consecutively through three phases of motion as follows: First phase, feeding the gear-blank along the cutter until all of the tooth spaces are rough-cut; second phase, moving the rough-cut blank toward the cutter for a deeper cut; third phase, feeding the rough-cut blank backward along the cutter until all of the teeth are finished.

17. In a gear cutting machine comprising a rack-type cutter reciprocable in a fixed path, automatic means to guide and propel a gear-blank through a four-phase cycle of motion as follows: First phase, feeding the gear-blank forward along the cutter; second phase, moving the gear-blank toward the cutter for a deeper cut; third phase, feeding the gear-blank backward along the cutter; fourth phase, moving the finished gear to permanent rest at the initial position of the gear-blank.

18. In a gear cutting machine comprising a rack-type cutter reciprocable in a fixed path, automatic means to guide and propel a gear-blank through a four-phase cycle of motion as follows: First phase, feeding the gear-blank along the cutter until all of the tooth spaces are rough-cut; second phase, moving the rough-cut blank toward the cutter for a deeper cut; third phase, feeding the rough-cut blank backward along the cutter until all of the teeth are finished; fourth phase, moving the finished gear to permanent rest at the initial position of the gear-blank.

FORREST R. JONES.